3,014,045
4-HALO-3-HALOMETHYLTETRAHYDROPYRAN

Erich Marcus and John T. Fitzpatrick, Charleston, W. Va., assignors to Union Carbide Corporation, New York, N.Y., a corporation of New York
No Drawing. Filed Dec. 16, 1959, Ser. No. 859,857
4 Claims. (Cl. 260—345.1)

This invention relates to halotetrahydropyrans useful as intermediates in the preparation of plasticizers and biologically active derivatives. In a particular aspect, this invention relates to a novel process for producing halotetrahydropyrans from the reaction of aliphatic conjugated dienes with alpha-haloalkyl ethers.

It has been discovered that a valuable class of halotetrahydropyrans corresponding to the general formula

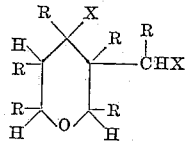

can be produced by a process which comprises reacting together an aliphatic conjugated diene corresponding to the formula

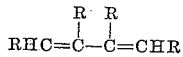

and an aliphatic ether corresponding to the formula

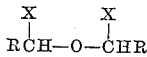

at a temperature between 10° C. and 100° C. in the presence of a Friedel-Crafts catalyst and in a molar ratio of said aliphatic ether to said aliphatic conjugated diene providing a molar excess of said aliphatic ether during the reaction, wherein R is a member selected from the group consisting of hydrogen and alkyl radicals containing between one and eight carbon atoms, and X is a halogen atom.

Illustrative of suitable alkyl radicals corresponding to R are methyl, ethyl, propyl, butyl, isobutyl, pentyl, isopentyl, hexyl, isohexyl, heptyl, octyl, isooctyl, and the like. The halogen atoms represented by X are chlorine, bromine and iodine.

Among the aliphatic alpha-haloethers which can be employed in the instant process are bis(chloromethyl) ether; bis(bromomethyl) ether; bis(alpha-chloroethyl) ether; bis(alpha-bromoethyl) ether; bis(alpha-chlorobutyl) ether; bis(alpha-bromoisopropyl) ether; chloromethyl alpha-chloroethyl ether; bis(alpha-bromooctyl) ether; bis(iodomethyl) ether; bis(alpha-iodoethyl) ether, and the like.

Among the aliphatic conjugated dienes which can be employed in the instant process are butadiene; 2-methyl-1,3-butadiene; 2-ethyl - 1,3-butadiene; 2-isopropyl-1,3-butadiene; 2-tert.-butyl-1,3-butadiene; 2-heptyl-1,3-butadiene; 2,3 - dimethyl - 1,3 - butadiene; 2 - ethyl-3-methyl-1,3-butadiene; 2-isopropyl - 3 - methyl - 1,3 - butadiene; 2,3-diisopropyl-1,3 - butadiene; 2,3-diisobutyl - 1,3-butadiene; 1,3-pentadiene; 1,3-hexadiene; 2,4-hexadiene; 2,4-octadiene; 3,5-octadiene; 2-ethyl-1,3-pentadiene; 3,5-dimethyl-2,4-hexadiene, and the like.

Halotetrahydropyrans which are particularly amenable for production by the instant invention process are those compounds corresponding to the above general formula in which R is a hydrogen or methyl radical and X is a chlorine or bromine atom. Illustrative of these compounds are 4-chloro-3 - (chloromethyl)tetrahydropyran; 4-bromo-3 - (bromomethyl)tetrahydropyran; 4-chloro-3-(chloromethyl)-2,6 - dimethyltetrahydropyran; 4-bromo-3-(bromomethyl)-2,6-dimethyltetrahydropyran; 4-chloro-3-(1 - chloroethyl)tetrahydropyran; 4-chloro-3-(chloromethyl)-4 - methyltetrahydropyran; 4-chloro-3-(1-chloroethyl)tetrahydropyran; 4-bromo-3 - (1-bromoethyl)tetrahydropyran, and the like.

The invention process is catalyzed by catalysts of the type employed in Friedel-Crafts reactions. Illustrative of the "Friedel-Crafts catalysts" are Lewis acid metal halides such as aluminum chloride, zinc chloride, titanium tetrachloride, stannic chloride, zinc bromide, stannic bromide, and the like, and Lewis acid boron halides such as boron trifluoride. By "Lewis acid" is meant compounds which are electron-acceptors. In certain cases it may be desirable to employ mineral acids such as hydrogen fluoride, sulfuric acid and phosphoric acid to catalyze the reaction.

The catalyst is employed in a quantity sufficient to catalyze the reaction at a practical rate. The quantity of catalyst and the reaction time required for the process can vary depending on the nature of the reactants and the reaction temperature. The quantity of catalyst can vary between about 1 weight percent and 25 weight percent, based on the weight of aliphatic conjugated diene employed. Preferably the catalyst is employed in a quantity between 5 and 10 weight percent, based on the weight of conjugated diene. The reaction time can vary between about 0.5 hour and 10 hours. In general, a reaction time between 4 hours and 8 hours is sufficient to complete the reaction. In a particularly preferred mode of conducting the invention process, the aliphatic conjugated diene is added slowly to the aliphatic alpha-halo-ether which is contained in the reaction zone under reaction conditions. The rate of addition of the aliphatic conjugated diene is a determining factor in the final overall reaction time. The addition period for the aliphatic conjugated diene can vary between about 2 hours and 6 hours. The faster rates of addition can be employed when a large molar excess of alpha-haloether reactant is being used, i.e., when the total moles of reactants in the process are in a ratio between about 2 moles and about 10 moles of alpha-haloether for each mole of aliphatic conjugated diene. The quantity of alpha-haloether employed in excess need only be limited by practical considerations.

The reaction of the aliphatic conjugated diene with the alpha-haloether to produce halotetrahydropyrans proceeds on a mole-to-mole basis. Hence, the process can be conducted employing equimolar quantities of reactants. However, it must be emphasized that it is essential that the alpha-haloether be present in a molar excess in the reaction zone during the reaction period. As mentioned previously, this is preferably accomplished by the slow addition of the aliphatic conjugated diene to the total quantity of alpha-haloether in the reaction zone. Alternatively, the total moles of reactants can be mixed and reacted directly if a severalfold molar excess of alpha-haloether is employed.

The process can be conducted at a temperature between 10° C. and 100° C. and preferably at a temperature in the range between 35° C. and 75° C. The pressure of the reaction system can be atmospheric or higher. In closed reaction systems such as a bomb, autogenous pressures are convenient and satisfactory. Superatmospheric pressures can be provided by the inclusion of an inert gas such as nitrogen in the reaction system.

The use of a polymerization inhibitor such as hydroquinone is advantageous and provides higher yields and cleaner products by preventing polymerization of the aliphatic conjugated diene component. If desired, inert solvents can be employed as a reaction medium, e.g., acetic acid, tetrahydrofuran, hexane, and the like.

The halotetrahydropyran can be isolated from the process reaction mixture by fractional distillation. If desired, the halotetrahydropyran can be submitted to further chemical transformation conditions in crude form without separation from the reaction mixture.

By the proper selection of aliphatic conjugated diene and alpha-haloether starting materials, halotetrahydropyrans can be produced which contain halogen atoms of different and varied reactivity. This permits selective chemical transformation of one halogen atom to the exclusion of the other. Such latitude of reactivity enhances the value of the halotetrahydropyran products of this invention as chemical intermediates.

The following examples will serve to illustrate specific embodiments of the invention.

EXAMPLE 1

*4-chloro-3-(chloromethyl)tetrahydropyran*

A mixture of 177 grams (1.54 moles) of bis(chloromethyl) ether, 2.0 grams freshly fused and pulverized zinc chloride, and 0.15 gram of hydroquinone was heated to a temperature of 50° C. To this mixture was added 28 grams (0.52 mole) of butadiene with stirring over a period of five hours with the temperature being maintained between 48° C. and 52° C. After the addition period was completed, the reaction mixture was then heated for an additional forty minutes at a temperature of 60° C. The reaction mixture was cooled, washed with ice water, then with cold three percent sodium bicarbonate solution, and finally with water again. The mixture was dried and filtered, and excess bis(chloromethyl) ether was distilled off under reduced pressure. Distillation of the residual oil afforded 49 grams (56 percent yield) of 4-chloro-3-(chloromethyl)tetrahydropyran, boiling point 48° C. to 50° C./0.15 millimeter of mercury pressure, $n_D^{30}$ 1.4869 to 1.4881. A second distillate fraction was recovered which contained an additional 4 grams (4 percent yield) of the same product. An analytical sample was prepared by redistillation, $n_D^{20}$ 1.4919, $d^{20}$ 1.264.

*Anal.*—Calc. for $C_6H_{10}Cl_2O$: C, 42.63; H, 5.96; Cl, 41.95; $M_D$ 39.08. Found: C, 42.53; H, 5.90; Cl, 41.96; $M_D$ 38.80.

The product reacted with silver nitrate at room temperature only very slowly indicating the absence of a highly reactive chloride. The infrared and mass spectra were consistent with the proposed structure.

EXAMPLE 2

*4-chloro-3-(chloromethyl)-4-methyltetrahydropyran*

This compound was prepared under conditions similar to those used in Example 1, except that butadiene was replaced by isoprene. The reaction product had a boiling point of 49° C. to 50° C./0.5 millimeter of mercury, and a refractive index of $n_D^{30}$ 1.4853.

*Anal.*—Calc. for $C_7H_{12}Cl_2O$: C, 45.92; H, 6.61; Cl, 38.73. Found: C, 46.67; H, 6.61; Cl, 37.61.

The infrared and mass spectra were in agreement with the assigned structure.

EXAMPLE 3

*4-chloro-3-(chloromethyl)-2,6-dimethyltetrahydropyran*

This compound was prepared under conditions similar to those used in Example 1, except that bis(chloromethyl) ether was replaced by bis(alpha-chloroethyl) ether. The crude product had a boiling point of 67° C. to 74° C./2.5 millimeters of mercury and a refractive index of $n_D^{30}$ 1.4732. The infrared and mass spectra were in agreement with the assigned structure.

EXAMPLE 4

This example illustrates the conversion of a halogenated tetrahydropyran product of this invention to a biologically active derivative.

A solution of 25.2 grams (0.15 mole) of 4-chloro-3-(chloromethyl)tetrahydropyran, 12.8 grams (0.158 mole) of sodium thiocyanate, and 60 milliliters of dimethylacetamide was maintained at a temperature between 70° C. to 80° C. for four hours with stirring, and then for an additional two and one-half hours at a temperature between 115° C. to 120° C. The reaction mixture was cooled and filtered and the filtrate was submitted to fractional distillation. 4-chloro-3-(thiocyanomethyl)tetrahydropyran was recovered as a light yellow oil, boiling point 100° C. to 105° C./0.3 millimeter of mercury pressure, $n_D^{30}$ 1.5241 to 1.5284.

*Anal.*—Calc. for $C_7H_{10}ClNOS$: C, 43.86; H, 5.22; N, 7.33; Cl, 18.49; S, 16.72. Found: C, 43.88; H, 5.30; N, 7.24; Cl, 18.15; S, 16.88.

4-chloro-3-(thiocyanomethyl)tetrahydropyran was tested and found to be an effective soil fungicide, especially against sclerotium. It also exhibited activity against aphids, and as a fly repellent.

EXAMPLE 5

*4-chloro-3-(cyanomethyl)tetrahydropyran*

In the same manner as Example 4, 4-chloro-3-(chloromethyl)tetrahydropyran (84.5 grams, 0.5 mole) was reacted with sodium cyanide (27 grams, 0.525 mole) in the presence of dimethylformamide. 4-chloro-3-(cyanomethyl)tetrahydropyran was recovered in 60 percent yield as a colorless oil, boiling point 85° C. to 96° C./0.3 millimeter of mercury pressure, $n_D^{30}$ 1.4809 to 1.4831. The material with the refractive index $n_D^{30}$ 1.4811 was analyzed.

*Anal.*—Calc. for $C_7H_{10}ClNO$: C, 52.68; H, 6.27; N, 8.78. Found: C, 52.35; H, 6.46; N, 8.49.

This compound is useful as a plasticizer for resins produced from vinyl halides and/or acrylonitrile and the like, e.g., dynel.

What is claimed is:

1. A process for producing halotetrahydropyrans of the formula

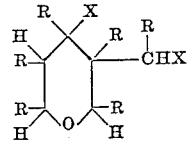

which comprises reacting a conjugated diene of the formula

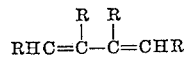

with an ether of the formula

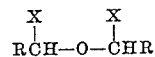

at a temperature between 10° C. and 100° C. in the presence of a Friedel-Crafts catalyst and in a molar ratio of said ether to said conjugated diene providing a molar excess of said ether during the reaction, wherein R is a member selected from the group consisting of hydrogen and alkyl having between one and eight carbon atoms, and X is a halogen atom selected from chlorine and bromine.

2. A process for producing the novel compound 4-chloro-3-(chloromethyl)tetrahydropyran which comprises reacting butadiene with a molar excess of bis(chloromethyl) ether at a temperature between 35° C. and 75° C. in the presence of a catalytic quantity of a Friedel-Crafts catalyst.

3. A process for producing the novel compound 4-methyl-4-chloro-3-(chloromethyl)tetrahydropyran which comprises reacting isoprene with a molar excess of bis-(chloromethyl) ether at a temperature between 35° C. and 75° C. in the presence of a catalytic quantity of a Friedel-Crafts catalyst.

4. A process for producing the novel compound 4-chloro-3-(chloromethyl)-2,6 - dimethyltetrahydropyran which comprises reacting butadiene with a molar excess of bis(alpha-chloroethyl) ether at a temperature between 35° C. and 75° C. in the presence of a catalytic quantity of a Friedel-Crafts catalyst.

No references cited.